(12) United States Patent
Joshi

(10) Patent No.: US 7,035,262 B1
(45) Date of Patent: Apr. 25, 2006

(54) SOFTWARE-BASED EMULATION OF SINGLE SONET PATH LAYER

(75) Inventor: Aniruddha Joshi, Santa Clara, CA (US)

(73) Assignee: Cisco Systems, Inc., San Jose, CA (US)

( * ) Notice: Subject to any disclaimer, the term of this patent is extended or adjusted under 35 U.S.C. 154(b) by 998 days.

(21) Appl. No.: 10/029,188

(22) Filed: Dec. 19, 2001

(51) Int. Cl.
*H04L 12/56* (2006.01)
*H04L 12/28* (2006.01)

(52) U.S. Cl. .................... 370/395.1; 370/466; 370/907

(58) Field of Classification Search ............... None
See application file for complete search history.

(56) References Cited

U.S. PATENT DOCUMENTS 6,868,057 B1 * 3/2005 Sha ........................ 370/216

* cited by examiner

*Primary Examiner*—Chi Pham
(74) *Attorney, Agent, or Firm*—Blakely, Sokoloff, Taylor & Zafman LLP

(57) ABSTRACT

A system and method are disclosed for using standard issue synchronous optical network (SONET) framers to comply with current automatic protection system (APS) standards. Each standard framer includes its own section, line, and path layer termination. The working set of lines and protection set of lines of the APS system are switched after the path layer rather than before. A firmware solution allows for a proper use of various error indication signals.

36 Claims, 4 Drawing Sheets

SOFTWARE-BASED EMULATION OF SINGLE SONET PATH LAYER

FIELD OF THE INVENTION

The field of the invention relates to asynchronous transfer mode communications. More specifically, it relates to modifying automatic protection switching for asynchronous transfer mode application.

BACKGROUND OF THE INVENTION

Automatic protection switching (APS) is a technique to achieve high availability by using synchronous optical network (SONET) line redundancy. A standard APS system is illustrated in FIG. 1. A switch 100 is connected to peer APS equipment 110 by a plurality of transmission lines. Asynchronous transfer mode (ATM) cells are transmitted via a set of primary transmission lines 120 and 125 called working lines. The working lines includes a SONET line 120 for sending data and control information from the peer APS equipment 110 to the switch 100 and a SONET line 125 for sending data and control information back to the peer APS equipment 110. A second set of transmission lines is the protection set of lines. The protection set of lines also includes SONET lines 130 and 135.

A single framer device 140 connects the protection set of lines and the working set of lines to the ATM interface. The single framer 140 terminates a first SONET Line layer 141 for the working set of lines and a second SONET Line layer 142 for the protection set of lines. The single framer 140 also terminates a first SONET Section layer 143 for the working set of lines and a second SONET Section layer 144 for the protection set of lines. Both the working set of lines from the first line layer 141 and the protection set of lines from the second line layer 142 feed into a single common SONET Path layer 145. The single common path layer 145 then forwards the payload (i.e. ATM cells) through an interface 150, such as the Utopia interface, to the ATM device 160. In the reverse direction, cells originating from ATM device 160 reach the common path layer via an interface 170.

The common SONET Path can generate indications back to the peer APS equipment 110. These indications include remote defect indication (RDI) at the path layer (RDI-P) and far end block errors (FEBE). An RDI-P indication can be caused by loss of signal, loss of frame, loss of pointer, loss of cell delineation, an alarm indication signal (AIS) at the Line layer, an AIS at the Path layer (AIS-P), a signal label mismatch, an unequipped signal indication, and a path trace mismatch defect on the selected line.

As seen from FIG. 1, protection switching takes place between the SONET Line layer and the SONET Path layer, as mandated by existing standards. A selector 180 is positioned between common Path layer and Line layers to allow selection of data from the working line or the protection line for transmission downstream. A bridge 190 is positioned between common Path layers and Line layers to allow transmission of data to the working line or to the protection line or both. In 1+1 APS configuration, the bridge 190 transmits data to both lines. In 1:1 architecture, the bridge 190 transmits data to either the working line or to the protection line.

Under existing APS standards, certain defects on the selected line such as Loss of Signal (LOS), Loss of Frame (LOF), Loss of Pointer (LOP), AIS-P, AIS at the Line layer (AIS-L), Signal Label Mismatch, Unequipped and Loss of Cell Delineation (LOCD) each require RDI-P generation. In 1+1 APS operation, an RDI-P is generated and cleared for the working and protection lines simultaneously. In 1:n APS operation, RDI-P is transmitted on the line on which the bridge is positioned.

SUMMARY OF THE INVENTION

A system is described for a modified automatic protection system. A working set of transmission lines includes a working SONET line to receive asynchronous transfer mode (ATM) cells and a working SONET line to transmit ATM cells. A protection set of transmission lines includes a protection SONET line to receive the same ATM cells as part of an automatic protection system and a protection SONET line to transmit ATM cells. A framer is coupled to each set of transmission lines, the framer terminating a Section layer, a Line layer, and a Path layer. A selector is positioned between the ATM device and the SONET framers to allow selection of data from the working line or the protection line for transmission to the ATM device. A bridge is positioned between the ATM device and the SONET framers to allow transmission of data to the working line or to the protection line or both.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A system and method are disclosed for using standard synchronous optical network (SONET) framers to comply with current automatic protection switching (APS) standards. Each standard framer includes its own section, line, and path layer termination. The working set of lines and protection set of lines of the APS system are switched after the path layer rather than before. A firmware solution allows for a proper use of various error indication signals to emulate the appearance of a common path layer for both the working set of lines and the protection set of lines.

Figure 1:
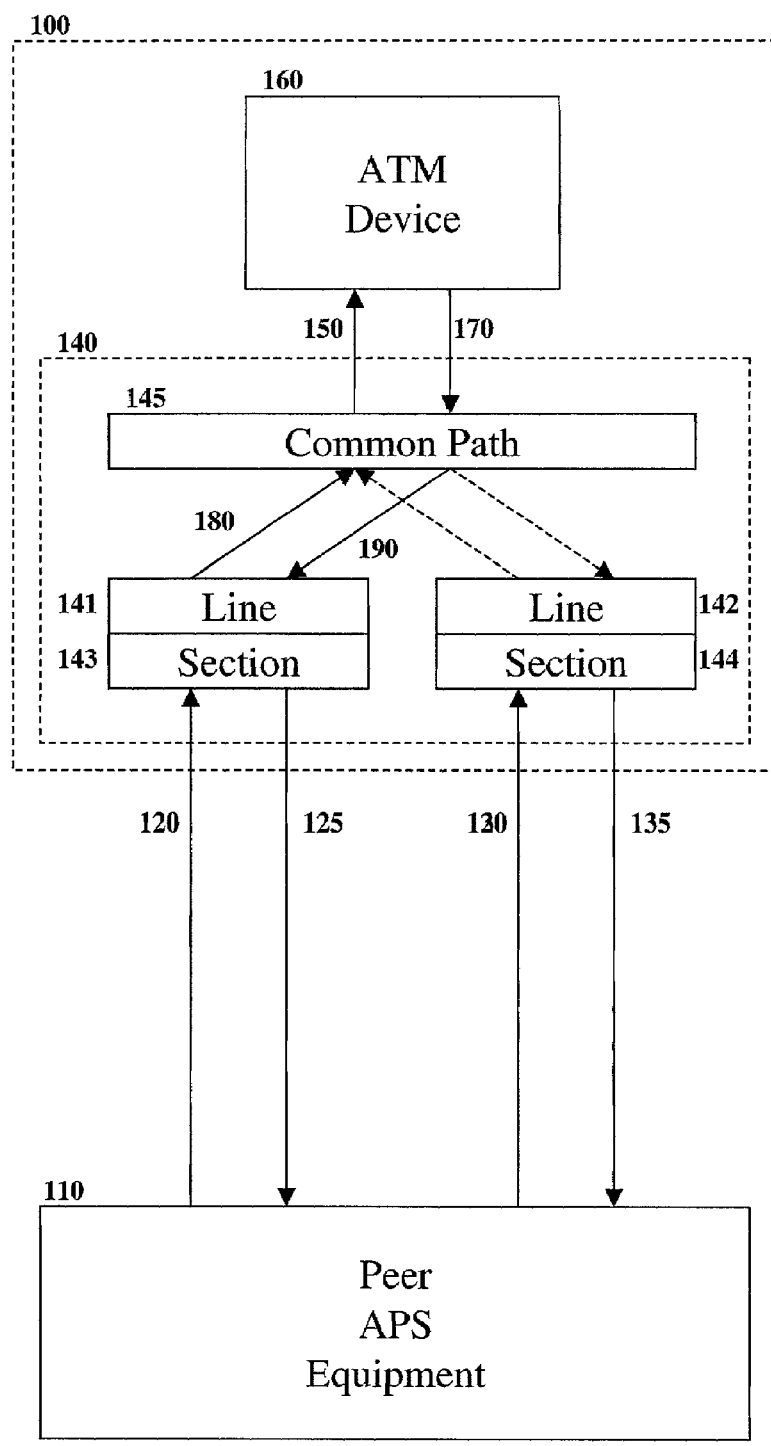
FIG. 1 is a block diagram illustrating the prior art automatic protection system.
Figure 2:
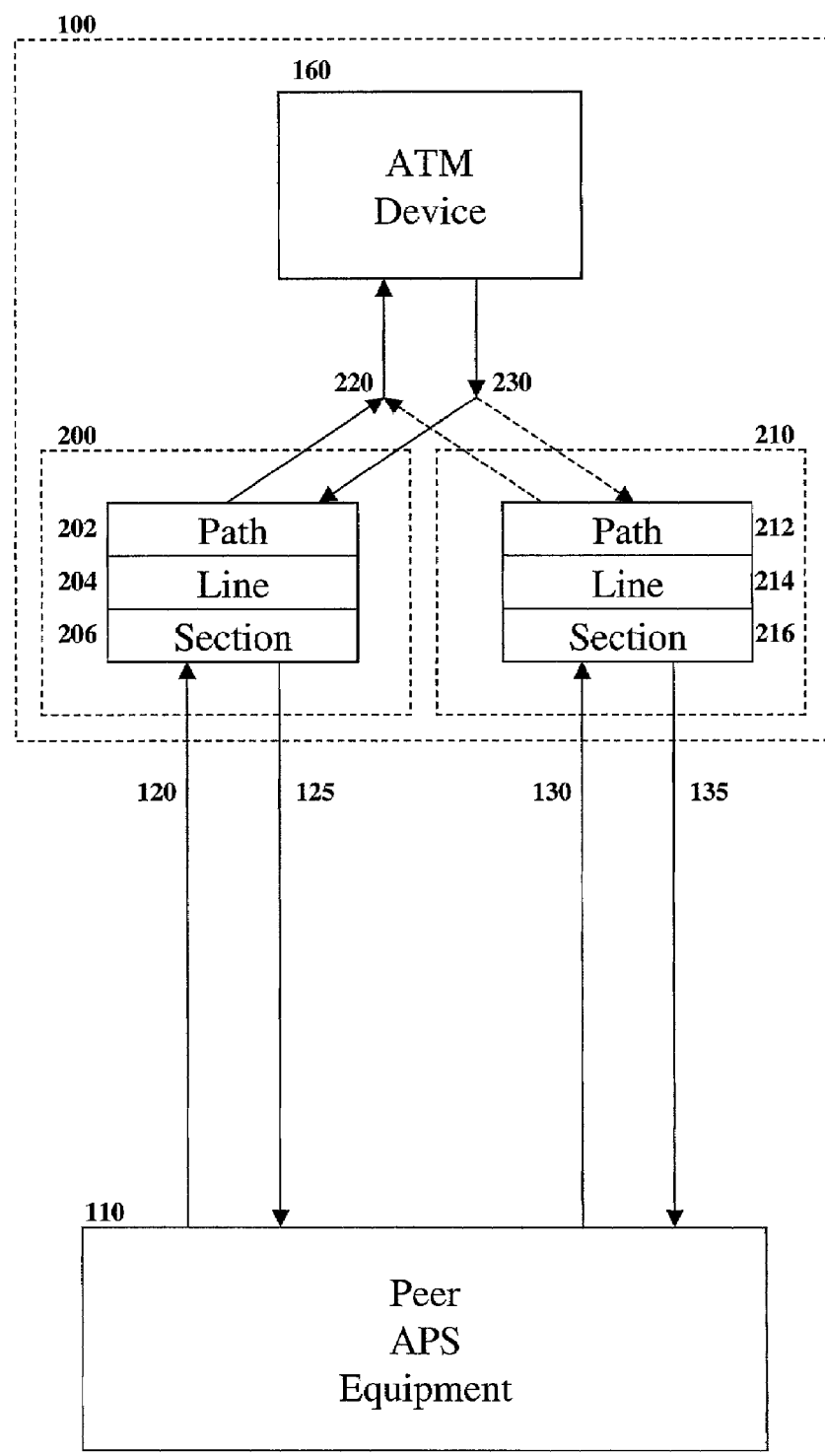
FIG. 2 is a block diagram illustrating the modified automatic protection system.

A modified SONET framer system, similar to the system in FIG. 1, is illustrated in FIG. 2. Instead of having a single framer with a common path for both the working set of lines and the protection set of lines, the working set of lines of the modified system is coupled to a first framer 200, the first framer having a separate path 202, line 204, and section layer 206. The protection set of lines is coupled to a second framer 210, the second framer having a separate path 212, line 214, and second layer 216. The asynchronous transfer mode (ATM) interface from the first framer 200 and the ATM interface from the second framer 210 are connected to a selector 220 coupled to the ATM device 160. The selector 220 determines from which line the ATM device 160 will receive a transmission. The ATM interface from the first framer 200 and the ATM interface to the second framer 210 are connected to a bridge 230 coupled to the interface. The bridge determines on which line or lines the ATM device 160 will send a transmission.

In one embodiment, the same data (an ATM cell) is transmitted on both the working set of lines and the protection set of lines, with the selector switching from the working set of lines to the protection set of lines (and vice versa) if a signal loss occurs. This embodiment is referred to as a 1+1 protection arrangement. In an alternate embodiment data is sent only on the working set of lines. The data is sent on the protection set of lines only if a signal loss occurs at the remote end of the working set of lines. This embodiment is referred to as a 1:1 protection arrangement. In a further embodiment of this 1:1 protection arrangement, one protection set of lines can service a plurality of working sets of lines. If one set of the plurality of working sets of lines experiences the signal loss at the remote end, the data being sent on that working set of lines is sent on the protection set of lines. This embodiment is referred to as a 1:n protection arrangement.

In most instances, the peer APS equipment 110 would have no indication that the working set of lines and protection set of lines have independently terminated path layers. In general, the primary instances in which the common Path layer signals the peer APS equipment 110, thereby signaling its presence to the peer APS equipment, are error indications. In one embodiment, the ATM device of the modified APS of FIG. 2 runs a software program to emulate error indications for a common Path layer.

The independent termination of the path layers for the working sets of lines and protection sets of lines results in path overheads, such as remote defect indication (RDI), alarm indication signal (AIS), and far end block errors (FEBE), getting transmitted independently for both working sets of lines and protection sets of lines. If the working set of lines is in loss of signal state, then an RDI at the Path layer (RDI-P) indication is transmitted on the working set of lines, even though the selector is positioned on the protection set of lines. The peer APS equipment interprets the RDI-P as a remote failure, indicating remote traffic loss. In one embodiment, this problem is fixed by disabling the RDI-P generator in each framer device. The RDI-P indication is then generated when needed by the ATM device 160. The ATM device emulation of a common path layer disables automatic RDI-P generation in both framers.

Figure 3:
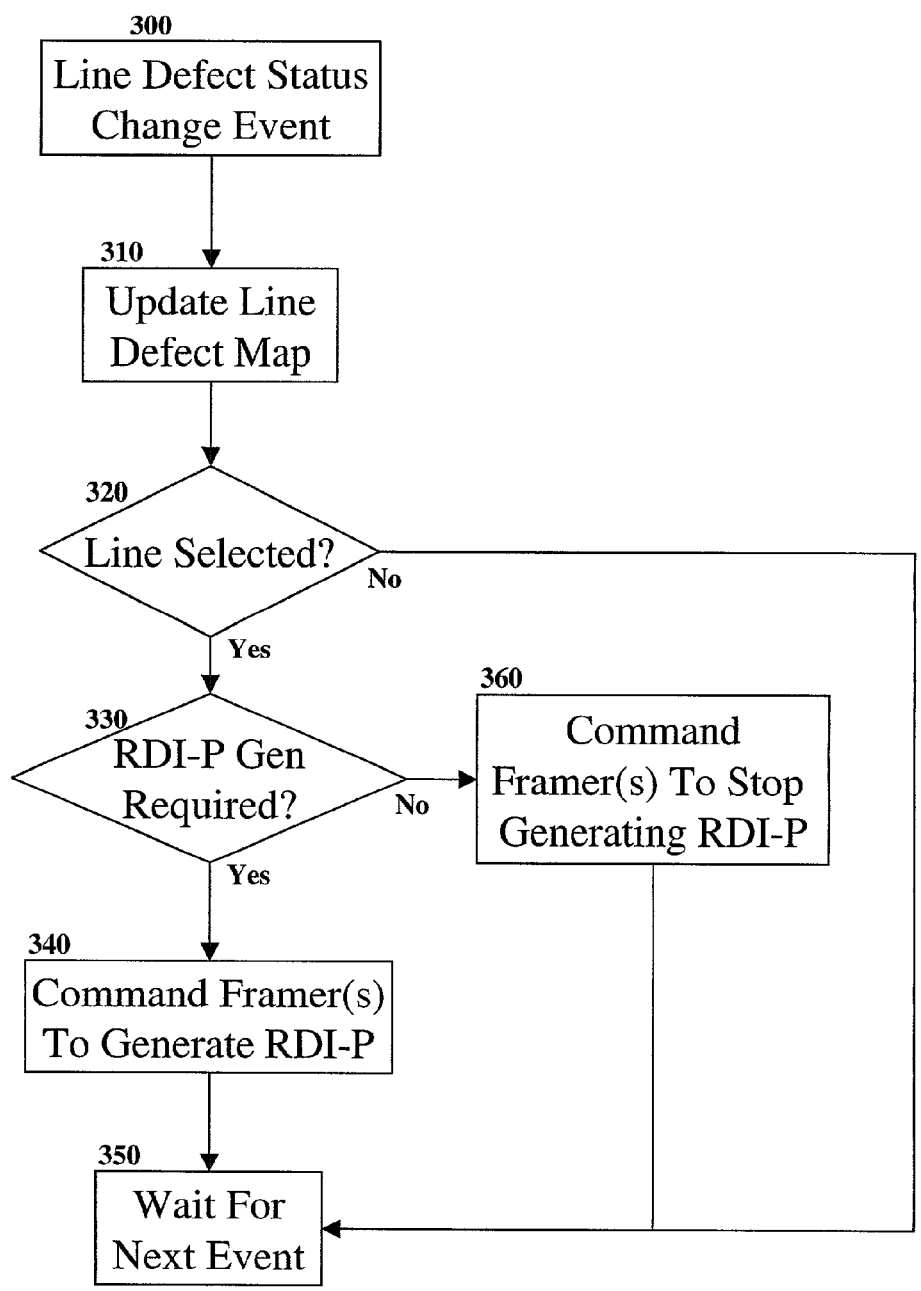
FIG. 3 is a flowchart of a method for RDI-P evaluation for line defect status changes.

In one embodiment, the ATM device 160 responds to changes in line defect status as illustrated in the flowchart of FIG. 3. Line defect status changes states due to a defect such as Loss of Signal (LOS), Loss of Frame (LOF), AIS-P, Loss of Pointer (LOP), or any other defect that indicates local traffic loss. A line defect initiates the evaluation of RDI-P (300). The line defect map is updated (310). If the selector has selected the line with the defect (320) and the defect map requires RDI-P generation (330), then the switch commands the framer or framers to generate an RDI-P (340) and waits for the next status change event (350). If the selector has selected the line with the defect (320) and the defect map does not require RDI-P generation (330), then the switch commands the framer or framers to stop generating an RDI-P (360) and waits for the next status change event (350). If the selector has not selected the line with the defect (320), then the switch waits for the next status change event (350).

Figure 4:
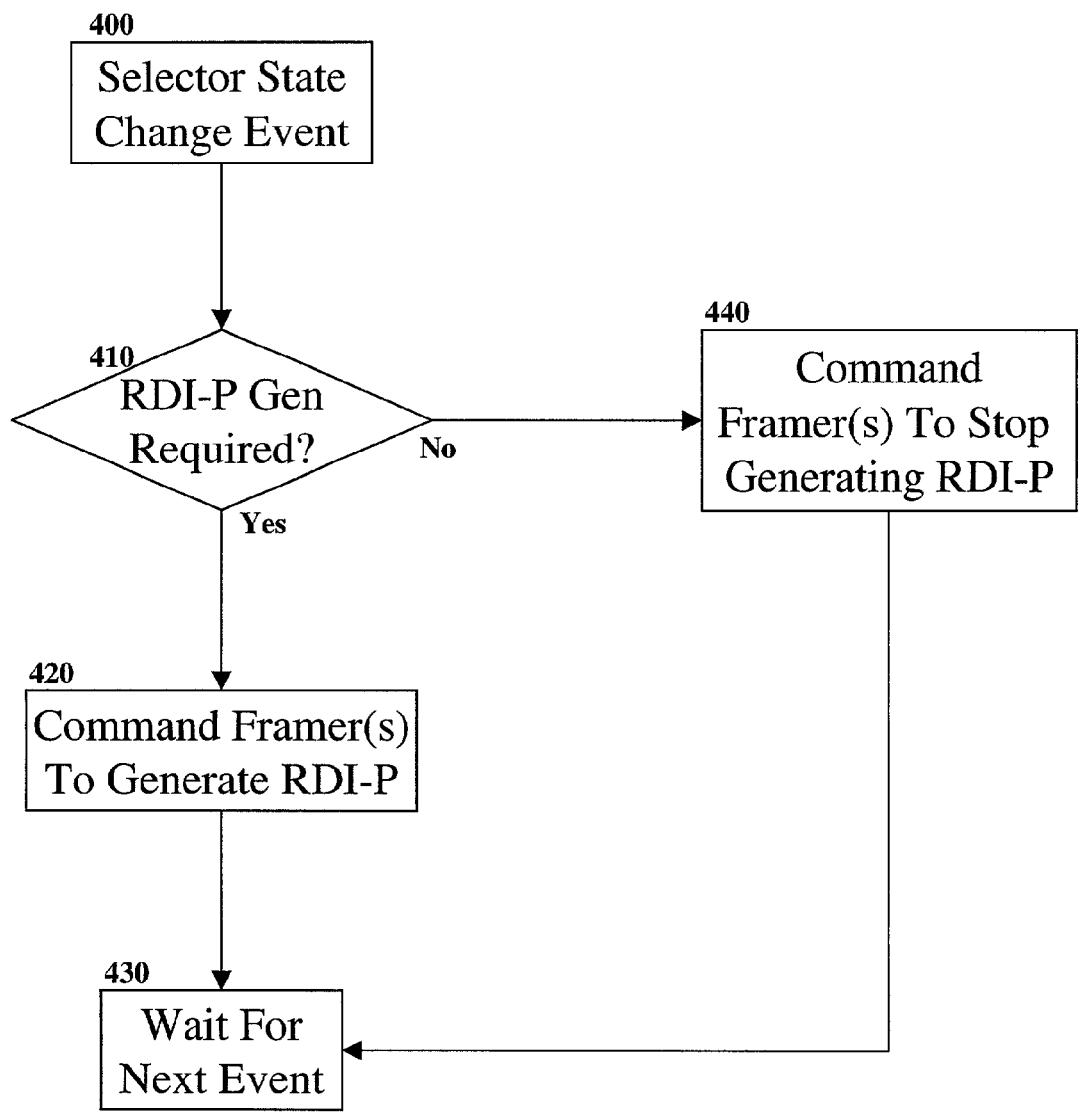
FIG. 4 is a flowchart of a method for RDI-P evaluation for selector state changes.

In one embodiment, the ATM device 160 responds to selector state changes as illustrated in the flowchart of FIG. 4. A selector state change initiates the evaluation of RDI-P (400). If the defect map on the newly selected line requires RDI-P generation (410), then the switch commands the framer or framers to generate an RDI-P (420) and waits for the next status change event (430). If the defect map on the newly selected line does not require RDI-P generation (410), then the switch commands the framer or framers to stop generating an RDI-P (440) and waits for the next status change event (430).

The method described above can be stored in the memory of a computer system as a set of instructions to be executed. The instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented by additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An apparatus, comprising:
   a first framer coupled to a working set of synchronous optical network (SONET) lines, the first framer terminating a SONET section layer, a line layer, and a path layer;
   a second framer coupled to a protection set SONET lines, the second framer terminating a SONET section layer, a line layer, and a path layer;
   a selector controlling asynchronous transfer mode (ATM) cell reception from each set of SONET lines, the selector coupled to both the first framer and the second framer after the path layer;
   a bridge controlling ATM cell transmission to each transmission line, the bridge coupled to both the first framer and the second framer before the path layer; and
   an ATM device to receive and transmit ATM cells, the ATM device coupled to the selector and the bridge.

2. The apparatus of claim 1, wherein automatic transmission of a remote defect indication signal in the path layer in each framer is disabled.

3. The apparatus of claim 2, wherein a software program run by the ATM device controls transmission of the remote defect indication signal.

4. The apparatus of claim 1, further comprising a software program run by the ATM device to receive, process, and respond to path layer indications received from the working set of lines or the protection set of lines.

5. The apparatus of claim 1, wherein the same ATM cell is always sent on the protection set of SONET lines when sent on the working set of SONET lines.

6. The apparatus of claim 1, wherein the same ATM cell is sent on the protection set of SONET lines only when requested to by peer equipment.

7. The apparatus of claim 6, wherein the protection set of SONET lines protects more than one working set of SONET lines.

8. A method, comprising:
selecting with a selector to receive asynchronous transfer mode (ATM) cells on a working set of synchronous optical network (SONET) lines through a first framer, the first framer having a first section layer, a first line layer, and a first path layer, the selector coupled to the first framer after the path layer;
selecting with a selector to receive the ATM cells on a protection set of SONET lines through a second framer if the working set of SONET lines is faulty or if requested by a user, the second framer having a second section layer, a second line layer, and a second path layer and the selector being coupled to the second framer after the second path layer; and
transmitting via a bridge ATM cells on the working set of SONET lines and on the protection set of SONET lines.

9. The method of claim 8, further comprising disabling automatic generation of a remote defect indication signal in the path layer in each framer.

10. The method of claim 9, further comprising controlling generation of the remote defect indication signal.

11. The method of claim 8, further comprising receiving, processing, and responding to path layer indications received from the working set of SONET lines or the protection set of SONET lines.

12. The method of claim 8, wherein an ATM cell is always sent on the protection set of SONET lines when sent on the working set of SONET lines.

13. The method of claim 8, wherein an ATM cell is sent on the protection set of SONET lines only if requested to by peer equipment.

14. The method of claim 13, wherein the protection set of SONET lines protects more than one working set of SONET lines.

15. A machine-readable storage medium tangibly embodying a sequence of instructions executable by the machine to perform a method comprising:
selecting with a selector to receive asynchronous transfer mode (ATM) cells on a working set of synchronous optical network (SONET) lines through a first framer, the first framer having a first section layer, a first line layer, and a first path layer, the selector coupled to the first framer after the path layer;
selecting with a selector to receive the ATM cells on a protection set of SONET lines through a second framer if the working set of SONET lines is faulty or if requested by a user, the second framer having a second section layer, a second line layer, and a second path layer and the selector being coupled to the second framer after the second path layer; and
transmitting via a bridge ATM cells on the working set of SONET lines and on the protection set of SONET lines.

16. The machine-readable storage medium of claim 15, further comprising disabling automatic generation of a remote defect indication signal in the path layer in each framer.

17. The machine-readable storage medium of claim 16, further comprising controlling the remote defect indication signal.

18. The machine-readable storage medium of claim 15, further comprising receiving, processing, and responding to path layer indications received from the working set of SONET lines or the protection set of SONET lines.

19. The machine-readable storage medium of claim 15, wherein an ATM cell is always sent on the protection set of SONET lines when sent on the working set of SONET lines.

20. The machine-readable storage medium of claim 15, wherein an ATM cell is sent on the protection set of SONET lines only if requested to by peer equipment.

21. The machine-readable storage medium of claim 20, wherein the protection set of SONET lines protects more than one working set of SONET lines.

22. An apparatus, comprising:
a means for selecting with a selector to receive asynchronous transfer mode (ATM) cells on a working set of synchronous optical network (SONET) lines through a first framer, the first framer having a first section layer, a first line layer, and a first path layer, the selector coupled to the first framer after the path layer;
a means for selecting with a selector to receive the ATM cells on a protection set of SONET lines through a second framer if the working set of SONET lines is faulty or if requested by a user, the second framer having a second section layer, a second line layer, and a second path layer and the selector being coupled to the second framer after the second path layer; and
a means for transmitting via a bridge ATM cells on the working set of SONET lines and on the protection set of SONET lines.

23. The apparatus of claim 22, further comprising a means for disabling automatic generation of a remote defect indication signal in the path layer in each framer.

24. The apparatus of claim 23, further comprising a means for controlling the remote defect indication signal.

25. The apparatus of claim 22, further comprising a means for receiving, processing and responding to path layer indications received from the working set of SONET lines or the protection set of SONET lines.

26. The apparatus of claim 22, wherein an ATM cell is always sent on the protection set of SONET lines when sent on the working set of SONET lines.

27. The apparatus of claim 22, wherein an ATM cell is sent on the protection set of SONET lines only if requested to by peer equipment.

28. The apparatus of claim 27, wherein the protection set of SONET lines protects more than one working set of SONET lines.

29. A system, comprising:
a working set of synchronous optical network (SONET) lines, including a first working SONET line to receive asynchronous transfer mode (ATM) cells and a second working SONET line to transmit ATM cells;
a protection set of SONET lines, including a first protection SONET line to receive the ATM cells as part of an automatic protection system and a second protection SONET line to transmit ATM cells;
a first framer coupled to the working set of SONET lines, the first framer terminating a SONET section layer, a line layer, and a path layer;
a second framer coupled to a protection set SONET lines, the second framer terminating a SONET section layer, a line layer, and a path layer;
a selector controlling ATM cell reception from each set of SONET lines, the selector coupled to both the first framer and the second framer after the path layer;
a bridge controlling ATM cell transmission to each transmission line, the bridge coupled to both the first framer and the second framer before the path layer;

an ATM device to receive ATM cells, the ATM device coupled to the selector and the bridge; and an ATM transmitter to send ATM cells, the ATM transmitter coupled to the working set of transmission lines and the protection set of transmission lines.

30. The system of claim 29, wherein automatic transmission of a remote defect indication signal in the path layer in each framer is disabled.

31. The system of claim 30, wherein a software program run by the ATM device controls transmission of the remote defect indication signal.

32. The system of claim 29, further comprising a software program run by the ATM device to receive, process and respond to path layer indications received from the working set of lines or the protection set of lines.

33. The system of claim 29, wherein the same ATM cell is always sent on the protection set of SONET lines when sent on the working set of SONET lines.

34. The system of claim 29, wherein the same ATM cell is sent on the protection set of SONET lines only when requested to by peer equipment.

35. The system of claim 34, wherein the protection set of SONET lines protects more than one working set of SONET lines.

36. A method, comprising:

selecting with a selector to receive asynchronous transfer mode (ATM) cells on a working set of synchronous optical network (SONET) lines through a first framer, the first framer having a first section layer, a first line layer, and a first path layer, the selector coupled to the first framer after the path layer;

selecting with a selector to receive the ATM cells on a protection set of SONET lines through a second framer if the working set of SONET lines is faulty or if requested by a user, the second framer having a second section layer, a second line layer, and a second path layer and the selector being coupled to the second framer after the second path layer;

transmitting via a bridge ATM cells on the working set of SONET lines and on the protection set of SONET lines;

disabling automatic generation of a remote defect indication signal in the path layer in each framer;

controlling generation of the remote defect indication signal; and receiving, processing, and responding to path layer indications received from the working set of SONET lines or the protection set of SONET lines.

* * * * *